United States Patent
Lamke et al.

(10) Patent No.: US 8,413,750 B2
(45) Date of Patent: Apr. 9, 2013

(54) DEVICE FOR GENERATING AND TRANSMITTING DRIVE TORQUE

(75) Inventors: Martin Lamke, Ravensburg (DE); Rayk Hoffmann, Freidrichshafen (DE); Oliver Schell, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/996,128

(22) PCT Filed: May 27, 2009

(86) PCT No.: PCT/EP2009/056456
§ 371 (c)(1),
(2), (4) Date: Dec. 3, 2010

(87) PCT Pub. No.: WO2009/153150
PCT Pub. Date: Dec. 23, 2009

(65) Prior Publication Data
US 2011/0073389 A1   Mar. 31, 2011

(30) Foreign Application Priority Data
Jun. 16, 2008 (DE) .......................... 10 2008 002 441

(51) Int. Cl.
*B60K 1/00* (2006.01)
(52) U.S. Cl. .................. 180/65.6; 903/906; 318/538
(58) Field of Classification Search ............... 180/65.21, 180/65.6; 903/906, 909, 951; 318/159, 538, 318/539
See application file for complete search history.

(56) References Cited

U.S. PATENT DOCUMENTS

| 6,378,638 | B1 | 4/2002 | Mizon et al. |
| 6,401,850 | B1 * | 6/2002 | Bowen ..................... 180/65.6 |
| 6,864,607 | B2 | 3/2005 | Hashimoto |
| 7,393,296 | B2 | 7/2008 | Kano et al. |
| 7,508,151 | B2 * | 3/2009 | Hashimoto et al. ........... 318/538 |
| 2004/0045752 | A1 | 3/2004 | Omote et al. |
| 2008/0093135 | A1 | 4/2008 | Nomura et al. |
| 2008/0139323 | A1 | 6/2008 | Paumier et al. |

FOREIGN PATENT DOCUMENTS

| DE | 100 33 424 A1 | 1/2002 |
| EP | 1 354 744 A2 | 10/2003 |
| EP | 1 657 094 A1 | 5/2006 |
| FR | 2 881 380 A1 | 8/2006 |

* cited by examiner

*Primary Examiner* — John Walters
(74) *Attorney, Agent, or Firm* — Davis & Bujold, PLLC

(57) ABSTRACT

A device for a vehicle drive train for generating and transmitting drive torque to components of the drive train. The device comprises a shaft which is connected to the components of the drive train, at least first and second bearings which support the shaft and an electric motor for generating the transmitted drive torque. The electric motor comprises a stator and a rotor which is fixed to the shaft. The rotor is supported by one or more bearing surfaces. The device also comprises elements disposed on the shaft via which drive torque can be transmitted to the components of the drive train while introducing transverse force into the shaft. The rotor of the drive motor is positioned on the shaft such that the bearing surface is located in the region of maximum deflection caused by the transverse force in the shaft.

6 Claims, 1 Drawing Sheet

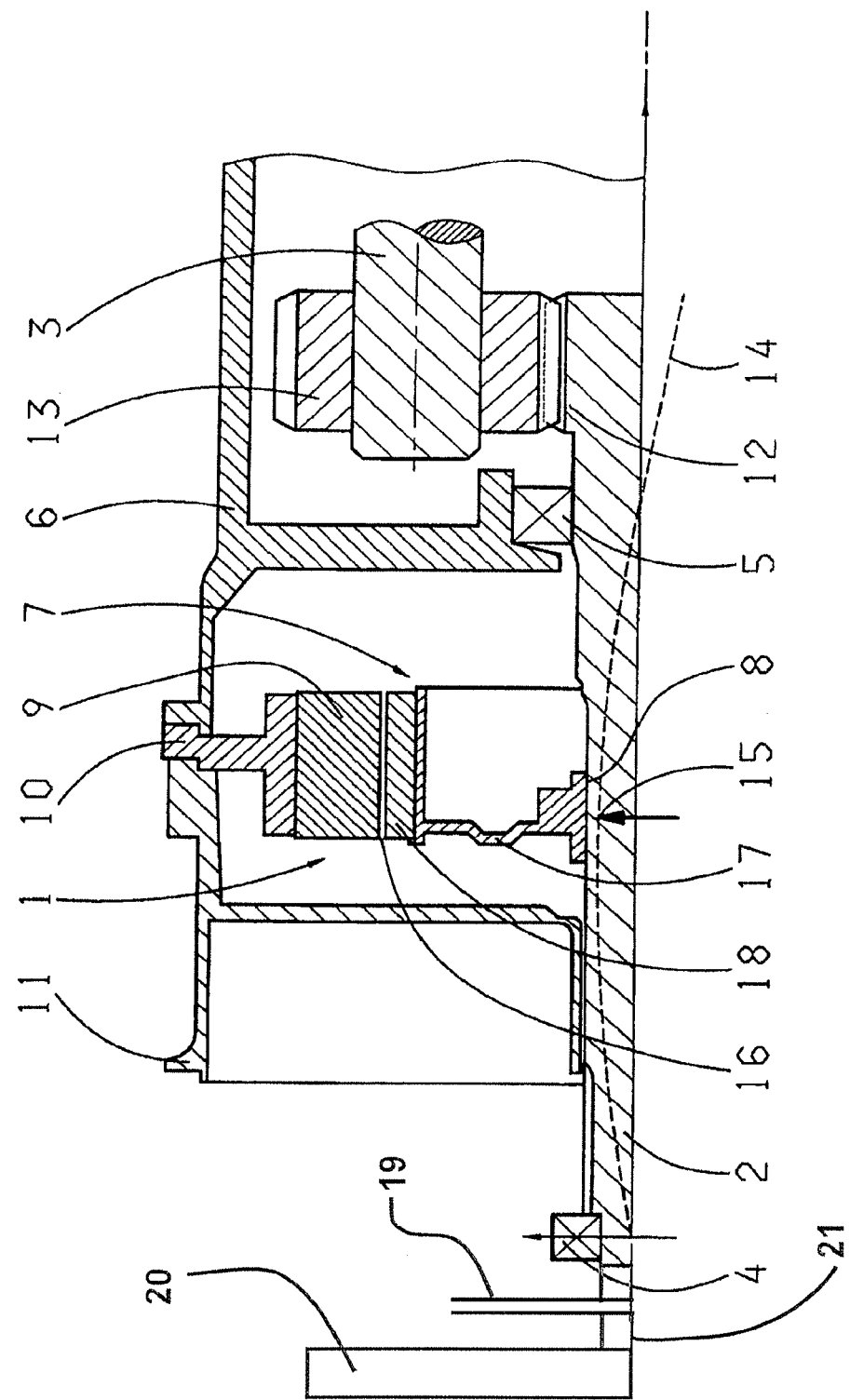

DEVICE FOR GENERATING AND TRANSMITTING DRIVE TORQUE

This application is a National Stage completion of PCT/EP2009/056456 filed May 27, 2009, which claims priority from German patent application serial no. 10 2008 002 441.4 filed Jun. 16, 2008.

FIELD OF THE INVENTION

The invention relates to a device for a vehicle drive train for generating and transmitting drive torque to components of the drive train.

BACKGROUND OF THE INVENTION

Such devices are used in a vehicle drive train to transmit drive torque and drive power from an electric drive motor and, if necessary, a second drive motor to components of the vehicle drive train such as a main gearing or distributor gearing. For this purpose, the second drive motor can be mechanically coupled to the device in the sense of a parallel hybrid drive train and, together with the electric drive motor, drive the components of the drive train, or, in the sense of a serial hybrid drive train, the second drive motor can be connected to a generator which is electrically connected to the electric drive motor which drives the components of the drive train on its own. According to both variants of the drive train, the electric drive motor is typically connected to a rechargeable energy accumulator and is operated, as needed, either as a generator to charge the energy accumulator or as a motor to drive the components of the drive train and thereby discharge the energy accumulator.

FIG. 1 in DE 100 33 424 A1 and the description therein disclose a device for a vehicle drive train for generating and transmitting drive torque to components of the drive train comprising a shaft, which is a transmission input shaft in this case, the input side of which can be operatively connected via a clutch to a drive motor, and the output side of which is operatively connected to further components of the drive train i.e. a transmission in this case. The device also comprises one first and one second bearing which rotatably support the shaft in a housing, and an electric drive motor which is disposed between the first and the second bearing and is composed of a stationary stator and a rotor which is non-rotatably coupled to the shaft. The rotor is non-rotatably coupled to the shaft via a gearwheel profile of the shaft on which the rotor lies via a plurality of bearing surfaces.

In such a device, transmission of drive torque from the shaft to the components of the drive train can cause transverse forces that act perpendicularly to the longitudinal direction of the shaft to be introduced into the shaft, e.g. when the shaft is coupled via a gear to a countershaft of a transmission and the electric drive motor introduces drive torque into the shaft during operation. These transverse forces, the intensity of which depends e.g. on the transmitted drive torque and the interconnection of the transmission, cause the shaft to bend, thereby changing the orientation of the rotor relative to the stator in terms of position and angle. The tilt of the rotor, in particular relative to the stator due to the deflection angle in the region of the bearing surface of the rotor, negatively affects the performance of the electric drive motor since the electric fields generated during operation of the electric drive motor no longer enter the rotor and the stator constantly at an intended favorable angle. Moreover, if the longitudinal dimension of the rotor is long, the tilting can cause the rotor to collide with the stator and thereby destroy the electric drive motor.

SUMMARY OF THE INVENTION

The problem addressed by the invention is therefore that of creating a device of the stated type, the electric drive motor of which operates with uniform performance. Another aim is to reduce the possibility of the rotor colliding with the stator.

This problem is solved by a device for a vehicle drive train for generating and transmitting drive torque to components of the drive train comprises a one-piece or multiple-part shaft which is operatively connected via an output side to the components of the drive train, at least one first and one second bearing which rotatably support the shaft, an electric drive motor which can generate at least a portion of the transmitted drive torque, and at least one stationary stator and a rotor which is non-rotatably connected to the shaft, the rotor lying on the shaft via at least one bearing surface. According to the invention, the device comprises means disposed on the shaft, by way of which drive torque can be transmitted to the components of the drive train while introducing at least one transverse force into the shaft, the rotor being positioned on the shaft such that the bearing surface is located in the region of maximum deflection caused by the transverse force in the shaft.

The basic idea of the invention is that the deflection angle of the shaft in the region of maximum deflection is very small and approaches zero in the immediate vicinity of the maximum. When the rotor is positioned in the sense of the invention, the position of the rotor relative to the stator still changes, but the tilt of the rotor is markedly reduced by the small deflection angle there; ideally, the rotor does not tilt at all. The electric fields generated during operation of the electric drive motor can therefore enter the stator and the rotor approximately constantly at the intended favorable angle, and so the performance of the drive motor does not change, or does so only to a negligible extent. In addition, the rotor is prevented from colliding with the stator due to the tilt. The change in the position of the rotor relative to the stator is compensated by the air gap located between the rotor and the stator.

According to a first development of the invention, the rotor is positioned on the shaft such that a maximum of the deflection is located at the half-way point along the length of an extension of the bearing surface in the longitudinal direction of the shaft. This means that the center of the bearing surface along the longitudinal direction of the shaft is located at the maximum of the deflection. Since the deflection of the shaft is at least approximately symmetrical in the region of a maximum, a tilt of the rotor in a first half of the bearing surface can be at least largely compensated by a tilt of the rotor in a second half of the bearing surface, thereby ensuring that the entire rotor does not tilt, or does so only to an insubstantially small extent.

According to a preferred development of the invention, the means for transmitting drive torque are disposed in the region of one end of the shaft and comprise at least one gear which is connected or detachably connectable to the shaft, wherein the first bearing is disposed in the region of another end of the shaft, and the second bearing is disposed between the means and the first bearing. The gear is preferably engaged with another gear of a vehicle main gearing onto which drive torque applied to the shaft is transmitted into the shaft with the introduction of a transverse force. The main gearing is preferably a transmission having at least one countershaft, e.g. a double clutch transmission or an automatic transmission. The shaft is therefore preferably a transmission input shaft which is rotatably supported by the first bearing against a motor output shaft, e.g. a crankshaft, of a second drive motor, and is rotatably supported by the second bearing against a housing, e.g. a housing of the main gearing, and therefore the motor output shaft can be detachably connected to the shaft by a clutch e.g. a friction start-up clutch.

According to a further development of the invention, the shaft, preferably a transmission input shaft, is rotatably supported by the first bearing on an intermediate housing, preferably a clutch bell, and is rotatably supported by the second bearing against a transmission housing, wherein a third bearing is provided that rotatably supports the shaft against a motor output shaft, preferably a crankshaft, of a second drive motor. The motor output shaft is detachably connectable to the shaft via a clutch, preferably a friction start-up clutch. Given that the shaft is supported at three or more points, the deflection thereof is markedly reduced, and placing the rotor in the region of maximum deflection reduces the tilt of the rotor. Thus, when drive torque is transmitted to the components of the drive train, the change in position of the rotor relative to the stator can be diminished as well as the tilt of the rotor. Since this results in an insubstantial change to the angle and the position of the rotor relative to the stator when torque is transmitted, the dimensions of the rotor and the stator can be well matched to one another, thereby increasing the performance of the electric drive motor. In addition, the emergency-operation properties of the device are improved since, if one of the bearings should fail, the remaining intact bearings can replace the failed bearing at least for the short-term.

According to a particularly preferred development of the invention, the stator is coupled in a stationary manner to the stator housing which is disposed between an intermediate housing, preferably a clutch bell, and a transmission housing, thereby simplifying the assembly of the device and, in particular, the installation of the stator.

Any known type of bearing can be used as the bearings. Roller bearings or friction bearings are readily available and inexpensive, making them particularly suitable. The bearings can be self-lubricating or require lubrication from external sources.

The rotor can be connected to the shaft using known shaft-hub connections e.g. using splines or involute toothing, or using a cylindrical or conical close-tolerance connection. An interference fit preferably exists between the bearing surface of the rotor and the shaft to inflexibly connect the rotor to the shaft and to prevent corrosion, in particular frictional corrosion, between the bearing surface and the shaft.

To simplify installation of the device in a vehicle drive train or to simplify assembly of the device, the shaft can have a multiple-part design in which a plurality of shaft segments are non-rotatably interconnected e.g. using complementary polygonal contours or flange connections.

BRIEF DESCRIPTION OF THE DRAWING

The invention is explained in greater detail in the following with reference to a drawing, based on which further advantageous embodiments can be derived. The figure shows, in a schematic depiction, an exposed half of the device in an installed state. The figure also shows the course of the deflection of the shaft along the longitudinal axis thereof, the point of maximum deflection being indicated by an arrow.

DETAILED DESCRIPTION OF THE PREFERRED EMBODIMENTS

In the embodiment of the invention shown, the one-piece shaft 2, which is connected to the electric drive motor 1, forms a transmission input shaft of a vehicle main gearing and is detachably operatively connected on the input side to a not-shown internal combustion engine as a second drive motor, and is operatively connected on the output side to a countershaft 3 of a vehicle main gearing. The shaft 2 is rotatably supported by the first bearing 4 in a not-shown motor output shaft, and is rotatably supported by the second bearing 5 in a transmission housing 6. The rotor 7 of the electric drive motor 1 is non-rotatably coupled via the bearing surface 8 to the shaft 2 and is secured thereto; the stator 9 of the electric motor 1 is coupled in a stationary manner to the stator housing 10 and is secured therein. The stator housing 10, in the sense of an intermediate housing, connects a clutch bell 11, which encloses a not-shown clutch for establishing the operative connection of the shaft 2 to the internal combustion engine, to the transmission housing 6 in which the drive torque transmitted by the device to the countershaft 3 is stepped up.

To transmit the drive torque of electric drive motor 1 and/or the second drive motor from the shaft 2 to the countershaft 3 in the sense of a component of the drive train, the output-side end of the shaft 2 is designed as a gear 12 which is engaged with a gear 13 non-rotatably disposed on the countershaft 3. When torque is transmitted, a transverse force that acts perpendicularly to the longitudinal direction of the shaft 2 is introduced into the shaft 2, thereby causing the shaft 2 to undergo deflection, the course of which in the longitudinal direction of the shaft 2 is indicated by the deflection curve 14. The deflection curve 14 can be determined in a known manner based on the transverse force introduction point or area, the locations and types of the bearings 4, 5, and the geometry of the shaft 2. Drive torque can also be transmitted to the countershaft 3 and to the components of the drive train e.g. using chain or belt transmission. The main gearing can likewise comprise a plurality of countershafts to which drive torque is transmitted, and the shaft 2 can comprise a plurality of gears which transmit drive torque to one or more countershafts of the main gearing. The gears are preferably disposed on the shaft 2 between the first and the second bearing 4, 5 and support the shaft exclusively against the transmission housing 6. The gear 12 or gears disposed on the shaft 2 can also be detachably connectable via a clutch to the shaft 2, e.g. to enable shifting between transmission ratios of the main gearing.

According to the invention, the rotor 7 of the electric drive motor 1 is disposed on the shaft 2 in a manner such that the bearing surface 8 of the rotor 7 is located in the region of the maximum 15 deflection, i.e. in the region of the maximum of the deflection curve 14 indicated by the arrow. To minimize the tilt of the rotor 7 relative to the stator 9, the center of the bearing surface 8 in the longitudinal direction of the shaft 2 is located exactly at the maximum 15. The air gap 16 between the rotor 7 and the stator 9 is sized such that the two components 7, 9 will not collide when the shaft 2 bends and the rotor 7 is thereby displaced relative to the stator 9.

In the embodiment shown, the electric drive motor 1 is a permanently-excited synchronous machine having an inner rotor, the rotor 9 of which is composed of a rotor support 17 and at least one laminated core 18 fastened to the rotor support 17. To improve the quiet running in particular, and to prevent torque peaks upon activation of the electric drive motor 1, the rotor support 17 can also be composed of two or more components which are preferably coupled to one another via torsion dampers or torsion springs. The electric drive motor 1 can have any other type of design, of course, e.g. it can be an outer-rotor motor or a pancake motor, and it can function on the basis of another principle, e.g. on the basis of the asynchronous principle or the reluctance principle.

The electric drive motor 1 is used preferably as a drive unit by converting electric energy into drive torque of the shaft 2 or into mechanical drive energy of the shaft 2, and as a generator by tapping mechanical energy at the shaft 2 and converting it into electric energy. The electric energy required for drive operation is preferably drawn from an energy accumulator e.g. a storage battery although, in the sense of a serial hybrid drive, it can also be provided by a generator coupled to the second drive motor which converts the mechanical drive energy of the second drive motor into usable electric drive energy for the electric drive motor 1.

The device is preferably disposed between a start-up clutch 19, which is used to establish the operative connection to the second drive motor 20, and a main gearing of a vehicle, the device forming a parallel hybrid drive with the second drive motor 20 when the start-up clutch 19 is actuated, i.e. engaged. The device then transmits the drive torque generated by the second drive motor, via the motor output shaft 21, and the drive torque generated by the electric drive motor to the components of the drive train.

The device can also be disposed between two clutches and be located upstream of a main gearing, in which case the first clutch can then detachably connect the shaft 2 to the second drive motor, and the second clutch can detachably connect the shaft 2 to the main gearing.

The device can also be disposed downstream of the main gearing, of course, in which case the shaft 2 is connected e.g. on the input side to an output shaft of the main gearing, and on the output side to distributor gearing or a differential of the vehicle. It can therefore also be used in the sense of a wheel hub motor, in which case the shaft 2 is preferably connected to a differential of the vehicle on the input side, and to a wheel hub on the output side.

If the deflection of the shaft 2, which is caused e.g. by a related shaping of the shaft 2 or by its being supported by more than two bearings, has a plurality of maxima, the rotor 7 is preferably located at the maximum that has the smallest amplitude, i.e. that induces the least amount of change in the position of the rotor 7 relative to the stator 9. As a result, the air gap 16 between the rotor 7 and the stator 9 can be designed to be very small, which increases the magnetic flux density between these two components 7, 9 during operation of the electric drive motor 1, thereby increasing the drive torque it can generate.

REFERENCE CHARACTERS 1 electric drive motor
2 shaft
3 countershaft
4 first bearing
5 second bearing
6 transmission housing
7 rotor
8 bearing surface
9 stator
10 stator housing
11 clutch bell
12 gear
13 gear
14 deflection curve
15 maximum deflection of shaft 2
16 air gap
17 rotor support
18 laminated core

The invention claimed is:

1. A device for a vehicle drive train for generating and transmitting drive torque to components (3, 13) of the drive train, the device comprising:

one of a one-piece and a multiple-part shaft (2) being operatively connected, on an output side thereof, to the components (3, 13) of the drive train;

at least first and second bearings (4, 5) rotatably supporting the shaft (2); and an electric drive motor (1) for generating at least a portion of the transmitted drive torque, the drive motor (1) comprising at least a stationary stator (9) and a rotor (7) which is non-rotatably connected to the shaft (2), and the rotor (7) being supported on the shaft (2) via at least one bearing surface (8);

wherein means (12) is disposed on the shaft (2) by which drive torque is transmittable to the components (3, 13) of the drive train while introducing at least one transverse force into the shaft (2), the rotor (7) of the drive motor (1) is positioned on the shaft (2) such that the bearing surface (8) is located in a region of maximum (15) deflection caused by the transverse force in the shaft (2) and centered with respect to the region of the maximum (15) deflection so as minimize tilt of the rotor (7) relative to the stator (9) upon deflection of the shaft (2).

2. The device according to claim 1, wherein the means (12) disposed on the shaft (2) are disposed in a region adjacent one end of the shaft (2) and comprises at least one gear (12) which is disposed on the shaft (2) and is either connected or detachably connectable to the shaft (2), the first bearing (4) is disposed adjacent an opposite end of the shaft (2), and the second bearing (5) is disposed between the means (12) disposed on the shaft (2) and the first bearing (4).

3. The device according to claim 1, wherein the device comprises a third bearing that rotatably supports the shaft (2) against a motor output shaft of a second drive motor, the first bearing (4) rotatably supports the shaft (2) against an intermediate housing (11), the second bearing (5) rotatably supports the shaft (2) against a transmission housing (6), and the motor output shaft is detachably connectable to the shaft (2) via a clutch.

4. The device according to claim 1, wherein the stator (9) is coupled in a stationary manner to a stator housing (10) which is disposed between an intermediate housing (11) and a transmission housing (6).

5. A device for a vehicle drive train for generating and transmitting drive torque to components (3, 13) of the drive train, the device comprising:

one of a one-piece and a multiple-part shaft (2) being operatively connected, on an output side thereof, to the components (3, 13) of the drive train;

at least first and second bearings (4, 5) rotatably supporting the shaft (2);

an electric drive motor (1) for generating at least a portion of the transmitted drive torque, the drive motor (1) comprising at least a stationary stator (9) and a rotor (7) which is non-rotatably connected to the shaft (2), and the rotor (7) being supported on the shaft (2) via at least one bearing surface (8);

means (12) is disposed on the shaft (2) by which drive torque is transmittable to the components (3, 13) of the drive train while introducing at least one transverse force into the shaft (2), the rotor (7) of the drive motor (1) is positioned on the shaft (2) such that the bearing surface (8) is located in a region of maximum (15) deflection caused by the transverse force in the shaft (2); and the rotor (7) is positioned on the shaft (2) such that the maximum (15) deflection is located at a half-way point along the length of an extension of the bearing surface (8) in a longitudinal direction of the shaft (2).

6. A device for a vehicle drive train for generating and transmitting drive torque to components (3, 13) of the drive train, the device comprising:

one of a one-piece and a multiple-part shaft (2) being operatively connected, on an output side thereof, to the components (3, 13) of the drive train;

at least first and second bearings (4, 5) rotatably supporting the shaft (2);

an electric drive motor (1) for generating at least a portion of the transmitted drive torque, the drive motor (1) comprising at least a stationary stator (9) and a rotor (7) which is non-rotatably connected to the shaft (2), and the rotor (7) being supported on the shaft (2) via at least one bearing surface (8);

means (12) is disposed on the shaft (2) by which drive torque is transmittable to the components (3, 13) of the drive train while introducing at least one transverse force into the shaft (2), the rotor (7) of the drive motor (1) is positioned on the shaft (2) such that the bearing surface (8) is located in a region of maximum (15) deflection caused by the transverse force in the shaft (2); and the shaft (2) is rotatably supported by the first bearing (4) against a motor output shaft of a second drive motor, and is rotatably supported by the second bearing (5) against a transmission housing (6), and the motor output shaft is detachably connectable to the shaft (2) via a clutch.

* * * * *

UNITED STATES PATENT AND TRADEMARK OFFICE
CERTIFICATE OF CORRECTION

PATENT NO. : 8,413,750 B2
APPLICATION NO. : 12/996128
DATED : April 9, 2013
INVENTOR(S) : Martin Lamke, Rayk Hoffmann and Oliver Schell Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Twenty-third Day of July, 2013

Teresa Stanek Rea
*Acting Director of the United States Patent and Trademark Office*